US009806518B2

(12) United States Patent
Kitchener et al.

(10) Patent No.: US 9,806,518 B2
(45) Date of Patent: Oct. 31, 2017

(54) METHODS OF ESTABLISHING AND ADJUSTING CURRENT LIMITS FOR DEVICE COUPLERS, AND AN ELECTRICAL CIRCUIT FOR PERFORMING THE METHODS

(71) Applicant: Pepperl + Fuchs GmbH, Mannheim (DE)

(72) Inventors: Renato Kitchener, West Sussex (GB); Gunther Rogoll, Mannheim (DE)

(73) Assignee: Pepperl + Fuchs GmbH (DE)

( * ) Notice: Subject to any disclaimer, the term of this patent is extended or adjusted under 35 U.S.C. 154(b) by 219 days.

(21) Appl. No.: 14/778,457

(22) PCT Filed: Mar. 18, 2014

(86) PCT No.: PCT/EP2014/055450
§ 371 (c)(1),
(2) Date: Sep. 18, 2015

(87) PCT Pub. No.: WO2014/147093
PCT Pub. Date: Sep. 25, 2014

(65) Prior Publication Data
US 2016/0233665 A1 Aug. 11, 2016

(30) Foreign Application Priority Data

Mar. 19, 2013 (GB) ................... 1304957.2

(51) Int. Cl.
*H02H 9/02* (2006.01)
*H02H 9/00* (2006.01)
*G05B 19/042* (2006.01)
*H02H 3/00* (2006.01)
(Continued)

(52) U.S. Cl.
CPC .......... *H02H 9/008* (2013.01); *G05B 19/042* (2013.01); *G05B 19/05* (2013.01); *H02H 3/006* (2013.01);
(Continued)

(58) Field of Classification Search
CPC ................. H02H 9/008; H02H 3/006
See application file for complete search history.

(56) References Cited

U.S. PATENT DOCUMENTS 7,454,252 B2   11/2008   El-Sayed
7,505,819 B2   3/2009    El-Sayed
(Continued)

FOREIGN PATENT DOCUMENTS

EP   1688811 A2    8/2006
EP   1819028 A2    8/2007
WO   2009/063213 A1   5/2009

OTHER PUBLICATIONS

International Search Report from International Publication No. PCT/EP2014/055450 mailed Jul. 2, 2014.

*Primary Examiner* — Scott Bauer
(74) *Attorney, Agent, or Firm* — Lerner, David, Littenberg, Krumholz & Mentlik, LLP

(57) ABSTRACT

A method of establishing current limits for each of a plurality of device couplers mounted on a trunk of an electrical circuit at distributed physical positions, in which each of said device couplers is capable of servicing one or more spurs connected thereto, and in which said trunk has a total trunk current and a known resistive component, comprising the steps of: a) establishing physical characteristics of the electrical circuit including i) an order in which said device couplers are mounted on said trunk along its length; ii) a load current each device coupler requires to service the one or more spurs connected thereto; and, iii) a voltage drop of each of said sections of trunk caused by the resistive component thereof, which is proportional to a physical length thereof and the combined load currents of each device coupler serviced by that section of trunk; b) calculating a current limit for each device coupler, which current limit is greater than said load current, according to a predetermined (Continued)

tolerance rationale; c) calculating an intermediate trunk current available to each device coupler by deducting from said total trunk current the current limits of each device coupler preceding that device coupler in said order, as well as a consequential reduction in current caused by said voltage drop of each of said sections of trunk preceding that device coupler; and, d) adjusting said current limits so none exceeds the intermediate trunk current available to the corresponding device coupler.

12 Claims, 4 Drawing Sheets

(51) Int. Cl.
    *G05B 19/05*     (2006.01)
    *H02J 1/04*     (2006.01)
(52) U.S. Cl.
    CPC ............ *H02J 1/04* (2013.01); *Y02B 70/3241* (2013.01); *Y04S 20/227* (2013.01)

(56) References Cited

U.S. PATENT DOCUMENTS

| | | | |
|---|---|---|---|
| 7,742,270 B2* | 6/2010 | Otto | H02H 9/008 |
| | | | 361/103 |
| 7,797,061 B2 | 9/2010 | El-Sayed | |
| 7,930,042 B2 | 4/2011 | El-Sayed | |
| 7,940,508 B2* | 5/2011 | Helfrick | H04L 12/40045 |
| | | | 361/119 |
| 8,392,058 B2 | 3/2013 | Kitchener et al. | |
| 8,467,196 B2* | 6/2013 | Rogoll | G05B 19/0423 |
| | | | 361/824 |
| 8,848,332 B2* | 9/2014 | Schmidt | H02H 9/008 |
| | | | 361/111 |
| 2003/0131293 A1 | 7/2003 | Strauser et al. | |
| 2006/0176629 A1 | 8/2006 | Graube | |
| 2007/0185588 A1* | 8/2007 | El-Sayed | G05B 9/03 |
| | | | 700/22 |

* cited by examiner

METHODS OF ESTABLISHING AND ADJUSTING CURRENT LIMITS FOR DEVICE COUPLERS, AND AN ELECTRICAL CIRCUIT FOR PERFORMING THE METHODS

CROSS-REFERENCE TO RELATED APPLICATIONS

The present application is a national phase entry under 35 U.S.C. §371 of International Application No. PCT/EP2014/055450 filed Mar. 18, 2014, published as WO 2014/147093 A1, which claims priority from GB Patent Application No. 1304957.2 filed Mar. 19, 2013, all of which are hereby incorporated herein by reference.

The present invention relates to methods of establishing and adjusting current limits for device couplers, and to an electrical circuit for performing those methods, for use particularly, but not exclusively, in two-wire distributed control systems.

Two distributed control systems are used in many industrial settings for controlling and monitoring a plurality of devices. Such systems operate under particular protocols, of which one example is Fieldbus. This is the name of a family of industrial computer network protocols used for real-time distributed control, now standardized as IEC61158. A complex automated industrial system, for example a fuel refinery, usually needs an organized hierarchy of controller systems to function. In this hierarchy there is a Human Machine Interface (HMI) at the top, where an operator can monitor or operate the system. This is typically linked to a middle layer of programmable logic controllers (PLC) via a non time critical communications system (e.g. Ethernet). At the bottom of the control chain is the Fieldbus, which links the PLCs to the components which actually do the work such as sensors, actuators, electric motors, console lights, switches, valves and contactors. The Fieldbus is usually a two wire combined power and data network, which provides both power and communications to the field components.

Fieldbus is often used in Intrinsically Safe environments, for example combustible atmospheres, and in particular gas group classification IIC, Hydrogen and Acetylene, and below, for example gas group IIB and IIA, for gas and/or dust. In typical combined two wire Fieldbus electrical power and communications circuit there is a power supply, an Intrinsic Safety barrier of some kind, a trunk section leading out into the field, a number of device couplers mounted on the trunk at distributed physical positions, and one or more spurs connected to each device coupler, on each of which one or more field instruments are mounted. The trunk and the spurs together form a "segment". The Intrinsic Safety barrier divides the circuit into an Intrinsically Safe side and a non-Intrinsically Safe side. The power supply, the PLCs and other systems like physical layer diagnostic modules which measure physical layer attributes of the electrical circuit and the network hardware, and in part the physical software or protocol being used, are located in the non-Intrinsically Safe side of the circuit, usually in a control room. The trunk, the device couplers, the spurs and the field instruments are located in the Intrinsically Safe side, out in the field. However, it is also possible to use Fieldbus, or any other similar two-wire protocol, in ordinary non-Intrinsically Safe environments and without any Intrinsic Safety barrier.

In any two-wire segment there are current limits in place, which act to prevent any device coupler or spur from drawing too much current in the event of a short or open circuit. This is vital in an Intrinsically Safe system, as the current limits act to prevent short or open circuits from forming combustible arcs. However, such systems also prevent a segment from failing in the event of a fault, because the fault can be isolated to a particular spur, and prevented from bringing the whole segment down. This is usually achieved with current limiting protection electronics within active device couplers, which act to either fully isolate or limit the current in a particular spur if a fault occurs thereon. Current limiting devices like this usually comprise a series semiconductor element and a current sense/drive circuit. The circuit monitors the current on the spur, and if it reaches a trip level as a result of a short circuit occurring on the spur the semiconductor is switched to limit the current, and to prevent the fault from affecting the rest of the segment. The circuit either works in a rectangular way and goes to a high impedance to limit the current to the trip level itself and holds it there for a particular period of time, or it works in a foldback way and limits the current to a lower level, thereby effectively isolating the spur from the rest of the segment.

Faults like this can occur when there is an inadvertent cable make, or if a device itself fails to a short circuit state, which could result from electronic component failure or even flooding of the instrument enclosure. The current limiting electronics prevent any such faults from short circuiting the trunk. Short circuits can also occur when a device is disconnected or when errors occur during routine maintenance and calibration, so the current limiting electronics acts as a safeguard and allows for routine work to be carried out on an active spur without the danger of it affecting other parts of the circuit.

When a two-wire system is initially designed the load currents of each spur and device coupler are known in theory, and as such a given amount of power is provided to the trunk to service these requirements. However, a problem confronting any existing or future two-wire system is the possibility of failure due to any over current demand somewhere on the segment which exceeds the design, and which then causes the supply voltage at a particular point elsewhere in the segment to fall below the required device input voltage, leading to device failure. A circuit design can often be quite different to the practical application, and in particular a load may be higher than the original calculation. In addition, while a circuit may be designed to accommodate one spur fault, it may not be able to accommodate two or more faults at the same time. Such faults can be inadvertent, such as short circuits or the like, but often they are caused by unscheduled or uncontrolled device loading.

This is an issue facing any two-wire system, be it simplex or redundant. The conventional way to address such a problem occurring on an existing segment is to power it down and re-commission it. In many cases this leads to the loss of many control loops and expensive down time.

Alternatively, when a circuit is initially designed a greater headroom could be provided to accommodate such faults or unexpected loads. However, this greater headroom would come at the expense of cable length and/or capacity. Classic Fieldbus systems allow for a fault of only one overloaded spur, which creates too great a risk when the system operates safety systems for example, or where there are as many as thirty-two spurs or devices, which increases the risk of simultaneous faults. However, increasing the headroom makes such systems very inefficient.

The alternative option of supplying only one voltage level to the whole network is also inefficient because it would require low loading with constant current loads.

FIG. 1 shows an embodiment of the third aspect of the present invention, and it is explained in full below, but it also illustrates the kind of two-wire network referred to above, and can be referred to in order to understand some of the relevant characteristics thereof. In FIG. 1 a two-wire Fieldbus system is based on an open simplex or redundant TCP/IP (Internet Protocol) system 1, which has one or more gateways 2a and 2b, a simplex or redundant trunk 3a and 3b, and simplex or redundant state variable (option) power supplies 4a and 4b. Mounted on the trunk 3a are one or more communicating device couplers 9a, 9b and 9n, in each case servicing one or more field devices 8 via a spur cables 11. It will be appreciated that what is shown in FIG. 1 is not limiting, and there could be more device couplers, and greater numbers of spurs connected thereto. It is also possible to connect a single spur or device directly to the trunk 3a, rather than via a device coupler. In the known arrangements the device couplers 9a, 9b and 9n would comprise static circuit protection against any spur over current.

In most Fieldbus systems, the trunk 3a, 3b is the longest cable, and for two-wire Fieldbus systems it takes the entire load current at least at the power supply end. Therefore, along a given length of trunk which comprises distributed or centralised device couplers, there is a voltage drop caused by the resistive component of the cable, proportional to the current flowing therethrough.

With distributed systems, the cable section 5 nearest the power supply 4a, drops the highest voltage due to it carrying the total current (/9a+/9b+/9n). However, this voltage drop decreases proportionally on the next section 6, because it carries less current (/9b+/9n). Likewise, the voltage drop decreases further on the final section 7, which carries the least current (/9n).

In practice the total current (/9a+/9b+/9n) is a combination of many variables which may be static or dynamic. The variables include static or dynamic device loads, device fault currents or spur cable short circuits. Whatever the situation, it is important that a minimum input voltage is provided for each participating component. It will be appreciated that this voltage is dependent on the specific current of any device, device coupler or fault at its particular location in the circuit. For example, an additional 100 mA load added to device coupler 9n would cause the input voltage to device coupler 9n to fall below the minimum required voltage, whereas the same 100 mA load added to device coupler 9a might not cause the input voltage to device coupler 9n to fall below the minimum required voltage. This is due to the cable's current-resistance-voltage (V/IR) characteristic based on cable length. (See FIG. 5 and the accompanying description below for a further explanation of this phenomenon.)

If sections 5, 6 and 7 are equal in length, and each device coupler 9a, 9b and 9n drew the same current, then the lowest voltage would be seen at device coupler 9n in this topology. This would not be the case in an alternative topology placing all three device couplers 9a, 9b and 9n at one centralised point at the end of section 7. As such, a distributed system like that shown is the more power efficient.

When a segment is initially designed the above described factors are taken into consideration, and then it is calculated what the currents and voltages will be at different parts of the segment. This is usually performed by a computer emulator/calculator (segment design checking), or it can be performed manually. However, in each case only the theoretical anticipated working condition can be considered, and the maximum current limits extrapolated accordingly. In addition, only a given number of theoretical short circuit faults can be accommodated.

As a result of this approach, the circuit design is often inaccurate, and is usually based on conservative risk factors. In other words, greater tolerance is designed into the system than may be necessary in order to reduce the risk of failure, which results in underutilisation.

Further, with more and more complex systems being introduced into the Fieldbus (or similar) arena, the more difficult these kinds of calculations become, and the more time consuming the data input becomes.

In any event, these calculations are no longer applicable once the system is actually in place, and unanticipated operational conditions, faults or upgrades occur that were not anticipated by the initial calculation, and which therefore cause a segment to fail.

Even when a segment is designed well and can cope with many unexpected changes, it is still vulnerable to overloading and failure, even with spur fault protection incorporated. Even when a redundant trunk is provided, this will not offer any protection unless it has load sharing capability. Anyway, a system must be able to run in simplex mode should one power supply fail.

There is also a device inrush to consider. Device inrush current is caused by the need to charge up the support systems to cope with events such as device brown out and device attachment demands. It is known to choke the inrush, but this requires additional complex electronics. Alternatively, the power supply can be configured to cope with a total initialisation (system power up), with all loads demanding the charging current at the same time. This can be achieved by increasing the surge capability of the power supply. However, this is also at a cost, because the only time it will be used is at initialisation, after which the segment will be constantly powered for several months, during which time the power supply will be run at a decreased current.

Another problem which can occur, is that in some segments the loading is high, but the cable is short. This means that for constant current loads and a constant voltage supply of a given fixed maximum voltage, there may be a surplus voltage at the device couplers. This voltage could be in excess of 20V. If the power supply is set at 48V, and the current is 1 A, then the power is 48 Watts. At 80% efficiency, the power loss is 9.5 Watts. However, if the power supply is only required to run at 28V, then the power loss will be 28×1×0.2=5.5 Watts i.e. a potential saving of 4 Watts and approximately 50%.

Yet another problem is that when a system is redundant, like that shown in FIG. 1, operating a higher than required current limit or trip set point to provide greater headroom may not be desirable, because it may allow some disruptive faults to continue. A fault could exhibit a disruptive or intermittent fault characteristic but not trip the power supply, and the remaining power supply will initiate or take over leaving the fault to remain. This may not be an issue in most cases, but it does however leave the system vulnerable. For example, a segment requiring a 400 mA supply would not ideally be serviced by a power supply that triggered at 5A. Equally, using a 500 mA supply may not be useful if at a later date, the system requires expansion to 800 mA.

The present invention is intended to overcome some of the above described problems.

Therefore, according to a first aspect of the present invention a method of establishing current limits for each of a plurality of device couplers mounted on a trunk of an electrical circuit at distributed physical positions, in which each of said device couplers is capable of servicing one or more spurs connected thereto, and in which said trunk has a total trunk current and a known resistive component, comprises the steps of:

a) establishing physical characteristics of the electrical circuit including i) an order in which said device couplers are mounted on said trunk along its length; ii) a load current each device coupler requires to service the one or more spurs connected thereto; and, iii) a voltage drop of each of said sections of trunk caused by the resistive component thereof, which is proportional to a physical length thereof and the combined load currents of each device coupler serviced by that section of trunk;

b) calculating a current limit for each device coupler, which current limit is greater than said load current, according to a predetermined tolerance rationale;

c) calculating an intermediate trunk current available to each device coupler by deducting from said total trunk current the current limits of each device coupler preceding that device coupler in said order, as well as a consequential reduction in current caused by said voltage drop of each of said sections of trunk preceding that device coupler; and, d) adjusting said current limits so none exceeds the intermediate trunk current available to the corresponding device coupler.

Thus, the present invention provides a method of establishing current limits for any two or four-wire segment using any known protocol, which is based on the actual requirements in use, rather than on an initial theoretical design. It also allows for the device couplers to be placed anywhere on the trunk and be able to establish the current which is consequently available to them, because the reductions in current cause by the voltage drops of the upstream sections of trunk are taken into account. In addition, the method provides a mechanism whereby if the predetermined tolerance rationale, which would be a chosen headroom for faults etc., is too great, and one or more device couplers would be starved of current in the event of an upstream fault within this headroom, then the current limits can be reduced accordingly to prevent such an occurrence. The method of the first aspect of the present invention is therefore a way of self-regulating suitable current limits for a segment.

In one version of the invention step d) may comprise identifying any device coupler with a current limit which exceeds the intermediate trunk current available thereto, and either reducing that device coupler's current limit to be equal to or less than the intermediate trunk current available thereto, or increasing the intermediate trunk current available thereto so it is equal to or greater than that device coupler's current limit by reducing the current limit of one or more different device couplers upstream and/or downstream thereof. In the first instance the device coupler is essentially downgraded, which might require one or more spurs to be deactivated, or the headroom provided thereto to be reduced. In the second instance the headroom provided elsewhere in the segment is lowered in order to provide the necessary headroom at the device coupler in question. This could be achieved with only a small and relatively inconsequential reduction in headroom at several upstream device couplers, but the combination thereof could be significant.

Preferably said electrical circuit can further comprise a power supply and a current distribution control mechanism, and step a) can comprise each device coupler and said power supply taking a measurement of the current and/or voltage of said trunk and then communicating to said current distribution control mechanism said measurement, and in the case of each device coupler also communicating to said current distribution control mechanism said load current that device coupler requires to service the one or more spurs connected thereto. Further, step a) can comprise the current distribution control mechanism establishing said order in which said device couplers are mounted on said trunk by placing said measurements in order according to decreasing size, and step a) can also comprise the current distribution control mechanism establishing the voltage drop of each of said sections of trunk caused by the resistive component thereof by deducting the measurement provided by one device coupler from the measurement provided by the device coupler upstream thereof, or in the case of the first device coupler in said order the measurement provided by said power supply.

Therefore, the establishment of the necessary facts required to perform the method of the first aspect of the invention can be performed automatically by the device couplers communicating with the current distribution control mechanism. This "mechanism" can be any electronic device or system capable of performing these communications and calculations, and of storing the necessary data. It can subsist in one of the device couplers themselves, or in a separate management computer associated with the segment, or with the whole network.

Step a) can further comprise the current distribution control mechanism establishing the physical length of each of said sections of trunk by combining the load currents of all the device couplers succeeding one device coupler to determine a section current carried by the section of trunk downstream thereof, then calculating the physical length of that section of trunk as a factor of its consequential reduction in current caused by said voltage drop and said section current. This calculation can therefore be performed using the gathered data.

It will be appreciated that the first aspect of the present invention pertains to the initial set-up phase of a segment, but that the same inventive concept can also find application as a method of adjusting current limits in use when circumstances change.

Therefore, according to a second aspect of the present invention a method of adjusting current limits for each of a plurality of device couplers mounted on a trunk of an electrical circuit at distributed physical positions, in which each of said device couplers is capable of servicing one or more spurs connected thereto, in which said trunk has a total trunk current and a known resistive component, in which said device couplers are mounted in an order on said trunk along its length, thereby dividing said trunk into sections extending between said device couplers, each of which has a voltage drop caused by the resistive component thereof, in which each of said device couplers comprises an adjustable current limit established according to the method of any of claims 1 to 4 below, comprises the steps of:

a) changing a load current a subject device coupler draws to service the one or more spurs connected thereto, either deliberately by connecting or disconnecting a spur or unintentionally by means of a fault;

b) establishing an amended voltage drop of each of said sections of trunk caused by the resistive component thereof, which is proportional to its physical length and the changed combined load currents of each device coupler serviced by that section of trunk;

c) calculating an amended intermediate trunk current available to each device coupler by deducting from said total trunk current the device coupler current limits of each device coupler preceding that device coupler in said order, as well as an amended consequential reduction in current caused by said voltage drop of each of said sections of trunk preceding that device coupler; and, d) adjusting said current limits so none exceeds the intermediate trunk current available to the corresponding device coupler.

Thus, the second aspect of the present invention essentially involves re-calculating the device coupler current limits in the event of a change applied in use. This change could be a premeditated one, for example the attachment or detachment of a device, or it could be an inadvertent one, for example a make or break fault. Either way, provided the change is one which can be accommodated by the system (as opposed to one which cannot, in which case the current limit for the device coupler in question would be reached and the circuit would remain in a static fault status), the method would essentially operate as if the segment were new, and the current limits would be re-established to suit.

Preferably, in each case the difference between a device coupler's load current and current limit can be a surplus current, and when step a) comprises increasing (as opposed to decreasing) a load current said subject device coupler draws to service the one or more spurs connected thereto, step d) can comprise increasing the intermediate trunk current available to said subject device coupler by allocating all or part of a surplus current thereto. In essence, this involves re-allocating headroom to where it is needed in a self-regulatory fashion.

When a current distribution control mechanism is provided, step a) can comprise said subject device coupler communicating said increase in load current to said current distribution control mechanism, and then step d) can comprise said current distribution control mechanism adjusting one or more of said device coupler current limits in order to allocate all or part of a surplus current to said subject device, according to a predetermined re-allocation rationale. This re-allocation rationale can comprise any appropriate factors, for example a threshold down to which it is deemed safe to reduce a current limit, and beyond which it is not. This can be device coupler, or even spur specific.

In one version of the invention the current distribution control mechanism can comprise a spur hierarchy, which ranks spurs of said device couplers according to priority. When step a) comprises increasing a load current demand of said subject device coupler to a level greater than said subject device coupler's current limit, then in step d) said current distribution control mechanism can increase said subject device coupler's current limit to accommodate said increase in load current demand by deactivating one or more spurs of other device couplers, or of said subject device coupler, which rank lower than one or more spurs of said subject device coupler in said spur hierarchy. With this system important devices on a segment can be maintained at the sacrificial expense of others.

This system therefore selectively defines which devices or spurs would be turned off, and which devices are retained should the current limit be exceeded (or attempted to be exceeded), and no spare capacity can be attained from elsewhere (e.g. the system is working at capacity with all the permitted current limits used up). This option allows for safety critical devices or control loops to continue, and less critical devices to be powered down.

For example, a device coupler may have a device hierarchy list of the attached devices, where some devices may be monitoring, and some devices may be used for control loops. However, amongst the control loops, some elements may be more important than others, for example a tank filling control loop where the level measurement could be sacrificed in favour of the filling control valve, where the loss of the measurement would initiate a control valve shutdown in a fail safe way.

Equally, there may be a spur hierarchy comprising a joining rule where the last or latest attachment may be blocked or choked or require permission from the hierarchical system, even if allocation would be possible due to a sufficient surplus elsewhere. When communicating with a device for these purposes, its current demand may be obtained directly therefrom, or it may be obtained from a database if the device can communicate its model type. Alternatively, the system may provide this data to the device coupler from its own segment design records.

In one version of the invention, when step a) comprises decreasing a load current said subject device coupler draws to zero by disconnecting all spurs therefrom, then in steps b) to d) said subject device coupler can be excluded from consideration.

The reason for this feature is that a spur without a device attached could still be provided with a current limit, and therefore an allocation of the total trunk current in the method, if it was desired to accommodate things like a shorting of the terminals, an accidental attachment of a device or ancillary equipment, or if the spur is used for expansion or as a spare for fault change out.

Traditionally, all device couplers comprise spur short circuit protection with set maximum current limits or settable current limits using switches or potentiometers. In all cases, this is always active and can use up a quota of the total trunk current if ever activated deliberately or accidentally. In other words, it is always offers a fault potential and an overload current potential.

However, as referred to above, with the method of the present invention if any unused spur is probed, and if the spur is inactive, then it can be excluded and deactivated. Alternatively, it can be manually or automatically activated or deactivated by local or remote means or other predefined means.

If an inactive device coupler is subsequently made active, either by means of the deliberate connection of a device, or by means of a fault, a current limit can be made available by the current distribution control mechanism. This can be a previously permitted current limit, or a newly negotiated one. For example, the current limit may be 20 mA, but the newly attached device actually requires 27 mA. In this case, the current distribution control mechanism may redistribute current by decreasing the headroom of some other parts, or by decreasing the total system envelope headroom. In other words, a spur attachment request is first negotiated, then a current limit allocated, and this current limit can be free or borrowed from the surplus of one or more other device couplers. The current to the newly active spur can be delivered in full, or it can be ramped up.

If an active device coupler or spur is made inactive by the removal of a device, the current distribution control mechanism may sustain the previous current limit, or it may detect that there is no device attached and then reduce the current limit, potentially to release it for use elsewhere on the segment. Such functionality can be automatic and operate according to a set rationale, or it can be manually overridden. In other words, the spur or device coupler can be instructed to release a quota of current for other systems, and then be instructed to shut down.

In conclusion, once the system is set up and running, any device attachment or detachment, fault or current overload, either in isolation or in combination, will not lead a segment to fail in simplex or redundant mode. The system will allocate current accordingly, or it will sacrifice specific parts of the network in turn.

It will be appreciated that the methods of the first and second aspects of the present invention can be automatically performed by an electrical circuit adapted accordingly, and that such an electrical circuit would involve the same inventive concept as the methods.

Therefore, according to a third aspect of the present invention, an electrical circuit comprises a power supply, a trunk, a plurality of device couplers mounted on said trunk at distributed physical positions, and a current distribution control mechanism for performing the methods of any of claims 1 to 9 below, in which each of said device couplers is capable of servicing one or more spurs connected thereto, and comprises an electronically adjustable current limit, in which said trunk has a total trunk current and a known resistive component, in which said device couplers are mounted in an order on said trunk along its length, thereby dividing said trunk into sections extending between said device couplers, each of which has a voltage drop caused by the resistive component thereof, in which said current distribution control mechanism comprises a database populated with data after the method of claim 1 has been performed, said data comprising i) an order in which said device couplers are mounted on said trunk along its length; ii) a load current each device coupler requires to service the one or more spurs connected thereto; iii) a voltage drop of each of said sections of trunk caused by the resistive component thereof, which is proportional its physical length and the combined load currents of each device coupler serviced by that section of trunk; iv) an intermediate trunk current available to each device coupler; and v) a current limit for each device coupler, which current limit is greater than said load current, according to a predetermined tolerance rationale, and which also does not exceed the intermediate trunk current available thereto, and in which in the event of a change in current demand made by one of said device couplers said current distribution control mechanism is adapted to adjust the current limit of one or more of said device couplers to accommodate said change in current demand.

As referred to above, the current distribution control mechanism can be any electronic device or system capable of performing these communications and calculations, and of storing the necessary data. It can comprises one or more of said plurality of device couplers, or it can comprise management electronics hosted elsewhere.

From all of the above it will now be clear that the three aspects of the invention address the above described problems with known two-wire segment designs, by providing a degree of communication directly or indirectly between the power supply and the device couplers and/or between the device couplers themselves, which provides for an adaptive self regulating or hierarchical system approach.

The purpose of the communication is to ensure that at all times, there will always be adequate voltage at each device coupler regardless of what occurs on the segment.

To give an illustrative example, if two device couplers are attached to a given trunk, then when connected for the first time they will communicate with each other, or via a management computer, to test their relative positions on the trunk. They can do this by deducing the upstream resistance, by taking an absolute current and/or voltage measurement at their locations and comparing them, as referred to above. (Instead of this, or in conjunction with it, a known differential current can be injected by each device coupler, for example 10 mA or 20 mA, and voltage measurement before and after the injection will give a clear indication of the capacity of the device couplers, and the relation capacity with other device couplers by way of using the dI/dV calculation to establish the apparent resistance of the section that it is attached to, and extrapolating this. This only needs to be approximate and it can be used to extrapolate a V-I curve to define its operational envelope.) The measurements may be performed with or without device loads, but preferably with the full device loading. When doing this it may be assumed what the source voltage is, or it may be a preloaded or entered variable. Alternatively, the actual voltage may be communicated by the power supply to the device couplers.

From this point each device coupler knows its position on the trunk, as well as the cable lengths between each device coupler, and the total length between it and the power supply. At this point each device coupler will know what load current it can take, however it will not know what load current the other is taking or more specifically, will take. However, with the method of the first aspect of the present invention this information will be provided. Each of the two device couplers will know what the other is taking in terms of load current, and also what the other's current limit is. Further, if either of these two current limits will have a restrictive effect on one of the device couplers, then they will be able to restrict each other, or themselves, to achieve a working balance.

Generally, a network segment is installed according to the initial design template, which will have been designed to work correctly. As such, there should be very little error, and a high degree of headroom. However, what causes issues is that cables are often not at the exact length first designed, nor the loads at the exact design currents. With the method of the first aspect of the present invention each device coupler knows where it is positioned relative to other devices on the cable, and appropriately adjusted headrooms can then be established.

For example, if device coupler A is taking 100 mA and device coupler B is taking 200 mA, then one would assume that device coupler A could take 150 mA and device coupler B could take 250 mA. However, device coupler A could be at the extreme end of the cable, and if device coupler A took 250 mA whilst device coupler B is also taking 250 mA, the voltage at device coupler A could fall to below the minimum input voltage. Therefore, device couplers A and B would together perform an iterative process, based on the absolute needs (quota) for any spur quiescent current, for any given spur fault current, and perhaps for any inrush current, in order to work out an optimum total current limit four them both.

This current limit is static, and it will not initially permit a load that would exceed it to be attached to a given spur. However, using the method of the second aspect of the present invention the current limit would be reassessed in such an event, and the current limits for each device coupler on the trunk would be recalculated to accommodate the load with sufficient headroom across the segment if possible.

In order to facilitate the methods of the first and second aspects of the present invention it is possible to employ a hierarchical system comprising a micro and a macro power management for each device coupler, and optionally each power supply, for each device spur or for the system as a whole.

In terms of the micro power management, this can involve adaptive spur current limiting thresholds within each device coupler. The initial segment design will comprise default current limits for each spur and/or a total device coupler current limit, and these current limits will be used initially. So, when a device is attached to a spur during set-up, an automatic adaptive current limit is applied according to the design. If the device can be communicated with to assess what its current envelope will be (allowing for its peak current, including or excluding inrush), then the current limit can be altered at this micro power management level.

Once the devices are attached, then it will be possible to discern if there is any difference between the designed spur current and the actual spur current, which may be higher for some spurs, or lower for others. This difference could be due to a change in the device design or type and so on. If so, the device coupler can automatically balance out the current distribution between its spurs in a micro power management fashion, whilst maintaining the device coupler's overall initially allocated input current.

In addition, this micro management process can lead to the identification of a power surplus. For example, if the device coupler has an allocated current of 60 mA, and it has two spurs which each have an allocation of 15 mA, with an additional 10 mA headroom, e.g. a current limit of 25 mA for each spur, then if each device actually requires only 10 mA with the same headroom, then there will be a surplus of 20 mA, which can be "banked".

In each case, each spur will be allocated a given surplus current to allow for communication, drift, tolerance and so on, and this value can be defined in advance, or could be a default value that can be changed if required. At this point in the micro power management the number of spur short circuits, device faults or device overloads is not considered.

Therefore, each device coupler will calculate the distribution current and current limit for each spur attached thereto, based on the actual operating conditions, and taking into account any possible short circuit faults.

With regard to the macro power management involved in the methods of the first and second aspects of the present invention, this can involve adaptive device coupler load distribution. Once each device coupler has performed the micro power management described above, it can communicate with the other device couplers to identify its position on the trunk, and also to communicate if it has any surplus "banked" current.

As referred to above, the device couplers can identify their relative positions on the trunk by knowing a few variables and communicating them to each other, including i) the supply source voltage, ii) the input current for itself and for other participating device couplers and iii) the input voltage. From this, each device coupler can calculate its position based on the calculated resistance of the cable. (This may not be exacting, because each device coupler could be attached on a further spur to the trunk, however, collectively to total current is known, and the current to that spur would also be known.)

From there each device coupler will know what current it would be allowed to take. However, it will not be allowed to take this current until it can be calculated to be acceptable, by being checked against the requirements of the rest of the segment. Permission will be gained from the other device couplers or the current distribution control mechanism. This process may involve a redistribution of any surplus current identified during the micro power management stage, and one device coupler may give up its surplus to one or more other device couplers in order for the segment to work. A correction factor may be applied here, for example a surplus of 100 mA for a device coupler closer to the power supply, may not be allowed to be fully used by a coupler at the furthest point from the power supply. In addition, once any surplus is relinquished by a device coupler, there may need to be a further recalculation to ensure that each device coupler will still receive at least the minimum input voltage it requires.

Instead of redistributing any surplus current to other device couplers in this way, any of the device couplers may instead distribute any surplus amongst its own spurs, or the surplus may be used to create a higher headroom than in the initial segment design for that device coupler, or for any of its specific spurs. The surplus could also be reserved for specific devices that it is known will have a higher demand at certain points in time to perform certain functions. Equally, some devices may be driven into sleep mode instead.

In all cases, once a device coupler has settled on its current limit, it cannot change it or exceed it unless it is given permission to do so after communicating any change in requirement to the current distribution control mechanism, and the method of the second aspect of the present invention has been performed. A device coupler can still deal with a change internally according to its 'micro cycle' if possible, by perhaps redistributing headroom or surplus between spurs. It may also decide to turn specific spurs off according to its spur hierarchy, which ranks the spurs of a device coupler according to priority. This ranking may be predefined, but it could also be random, or it could be adaptive and be related to spur demand at a particular point.

In short, a segment of the third aspect of the present invention will have a 3D operating envelope ceiling. It can work at the ceiling, or within a safe distance from the ceiling. Linear or non-linear current distribution will be decided amongst the participating device couplers. There can also be a facility to manually override and redistribute the current if required.

With regard to the connection of new device to a spur of a device coupler, or even of a new device coupler to a segment, the current distribution control mechanism can communicate with it to provide it with a small joining current, which can come from any identified current surplus. However, this current allowance must be limited, because if a current demand made by a newly connected device is too high, then it could cause a segment to fail regardless of any protection means. For example, a device coupler should only be allowed a joining current of say 5 or 10 mA. If there is no spare capacity for 10 mA at the time, then the information could be reported to the installer via the IP network. Once joined and using said joining current, the new device or device coupler can then communicate its maximum working current to the current distribution control mechanism, in order to renegotiate a current limit with all the participating device couplers and/or the current distribution control mechanism, according to the method of the second aspect of the present invention. It can also assess each of its spur loads and attach one spur at a time, within the bounds of the current limit it has been given, and it can adjust the set points of each spur accordingly until the current limit is met or all the spurs are active.

As it is possible for the voltage and the current, and any losses along the cable (by inference), to be measured using the methods of the present invention, it is also possible to relay this information as power usage data which can then be sent over the IP network for energy monitoring and efficiency estimations.

The three aspects of the present invention can be performed in various ways, but one embodiment will now be described by way of example, and with reference to the accompanying drawings, in which.

Figure 1:
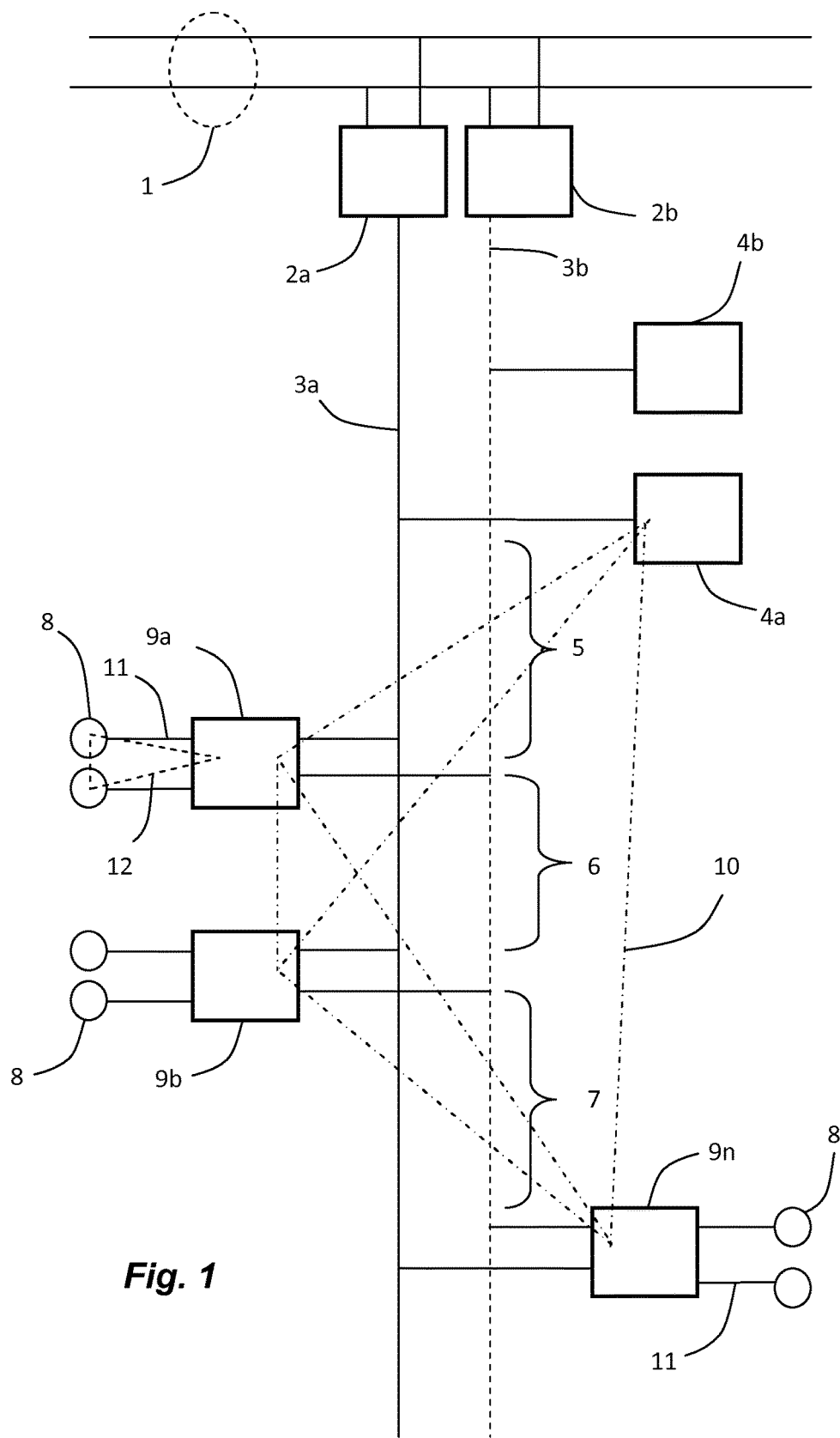
FIG. 1 is a diagrammatic view of an electrical circuit according to the third aspect of the present invention, which can perform the methods of the first and second aspects of the present invention.

FIG. 1 shows an electrical circuit according to the third aspect of the present invention, in the form of a two-wire Fieldbus segment. This comprises a power supply, in the form of redundant power supplies 4a and 4b, a trunk, in the form of redundant trunks 3a and 3b, a plurality of device couplers 9a, 9b and 9n mounted on said trunk 3a at distributed physical positions, and a current distribution control mechanism 10 for performing the methods of any of claims 1 to 9 below, which subsists in electronics provided in the device couplers 9a, 9b and 9n and in the power supply 4a, and which is illustrated in FIG. 1 by hashed lines of communication 10 between these components.

As described further below, each of said device couplers 9a, 9b and 9n is capable of servicing one or more spurs connected thereto, in the form of spur cables 11 and devices 8 attached thereto, and comprises an electronically adjustable current limit, which is set by a device current limit manager 28 shown in FIG. 3.

The trunk 3a has a total trunk current and a known resistive component, and the device couplers 9a, 9b and 9n are mounted in an order on said trunk 3a along its length, thereby dividing said trunk 3a into sections 5, 6 and 7 extending between said device couplers 9a, 9b and 9n, each of which has an inherent voltage drop caused by the resistive component thereof.

The current distribution control mechanism 10 comprises a database, in the form of database 13, which for illustrative purposes is vested in the device coupler 9a, although it will be appreciated that it could be situated anywhere in the segment, or in the segment logic controller. The database 13 is populated with data after the method of claim 1 has been performed, said data comprising at 14 an order in which said device couplers 9a-9n are mounted on said trunk 3a along its length, at 15 a load current each device coupler 9a-9n requires to service the one or more spurs 11 connected thereto, at 16 a voltage drop of each of said sections of trunk 5-7 caused by the resistive component thereof, which is proportional its physical length and the combined load currents 15 of each device coupler 9a-9n serviced by that section 5-7 of trunk 3a, at 17 an intermediate trunk current available to each device coupler 9a-9n, and at 18 a current limit for each device coupler 9a-9n, which current limit is greater than said load current 15, according to a predetermined tolerance rationale, and which also does not exceed the intermediate trunk current 17 available thereto. The predetermined tolerance rationale in this purely illustrative example is a headroom of 20 mA, or 25 percent of the load current 15, whichever is the lesser. It will be appreciated that this could be different, and that the rationale could be device coupler 9a-9n specific, depending on the devices 8 it services.

As explained elsewhere in this description, in the event of a change in current demand made by one of said device couplers 9a-9n said current distribution control mechanism 10 is adapted to adjust the current limit 18 of one or more of said device couplers 9a-9n to accommodate said change in current demand.

FIG. 1 shows how the current distribution control mechanism 10 extends between at least the device couplers 9a-9n that are attached to the trunk 3a, and also between the device couplers 9a-9n and the power supply 4a. It will be appreciated that it could also extend to the gateways 2a and 2b and the cabled network 1 so it can extend to a higher logic controller (not shown).

The communication facilitated by the current distribution control mechanism 10 can be wired, or it can be wireless, whichever would be appropriate. Each participating device 9a-9n and 4a could be a manager and/or a calculator and/or a monitor/injector and/or an adjustor, depending on how the current distribution control mechanism is established in the electronics. It will be appreciated that the skilled person could implement the various functions of the three aspects of the present invention within electronics situated anywhere in the communication network 10 shown, or in other IP (or other protocol) accessible devices attached to the network (not shown). As stated above, in this illustrative example the database 13 is situated in the electronics of the first device coupler 9a. In addition, management electronics 19 are provided in the power supply 4a, which are further described below.

It will also be appreciated that the manner in which the electronics is programmed to perform the various functions of the three aspects of the present invention will be a matter for the skilled person, and will be within his common general knowledge of electronics programming. Further, the particular rationales employed, such as those for determining the appropriate headrooms for the device couplers and spurs of the segment, and those for ranking spurs according to priority, will also be a matter for the skilled person, who can set such parameters according to requirements on site. As such, these particular aspects of the present invention are not further described herein in great detail.

Figure 2:
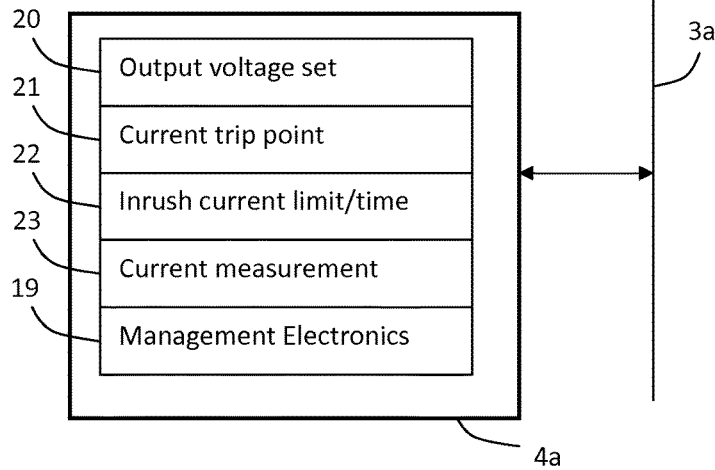
FIG. 2 is a diagrammatic view of a power supply as shown in FIG. 1.

FIG. 2 illustrates the power supply 4a, with an adjustable output voltage 20, a current trip point 21, a load inrush limit and time 22, and a current measurement 23. It could also include a current preload (not shown) that could be adjustable or selectable. The power supply 4a also hosts the management electronics 19, which receives data from the device couplers 9a-9n, and which performs the various calculations of the methods of the first and second aspects of the present invention.

The power supply 4a is also provided with means to means to communicate with the device couplers 9a-9n in the known way using Fieldbus telegrams. This allows for the management electronics 19 to receive data from the device couplers 9a-9n, and to transmit operational instructions thereto, in particular the current limits 18 each device coupler 9a-9n is to have once the methods of the first and second aspects of the present invention have been performed. It can also communicate its own output parameters of current and voltage, and it may take instructions from other participating devices to adjust the output voltage and/or output current trip points, and/or any inrush capacity.

The device couplers 9a-9n are also provided with means to communicate with each other and with the management electronics 19, in the known way using Fieldbus telegrams. As an integral part of the current distribution control mechanism, the device couplers 9a-9n also have the ability to take part in the adjustment of the operating parameters of other participating devices.

Figure 3:
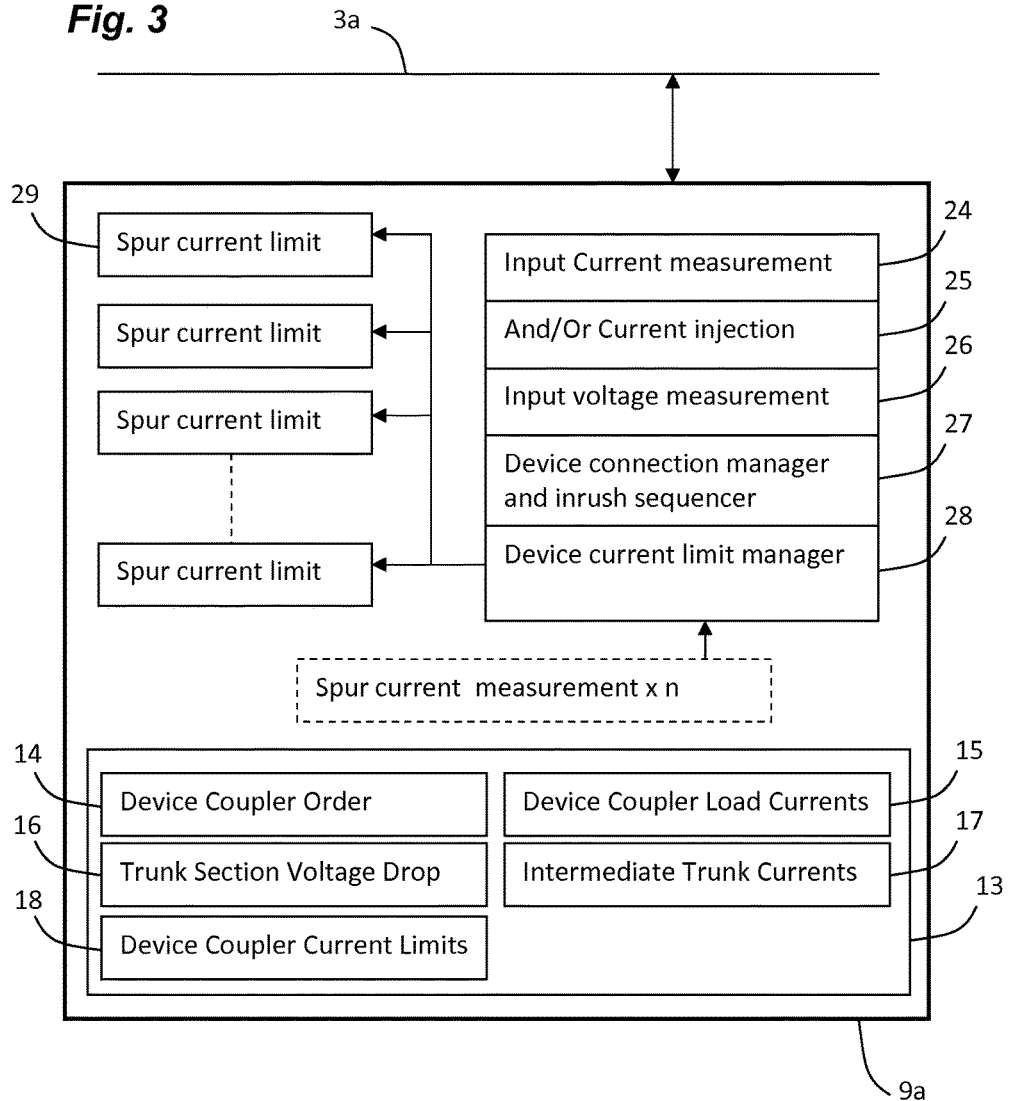
FIG. 3 is a diagrammatic view of a device coupler as shown in FIG. 1.

FIG. 3 illustrates the device coupler 9a, with an input current measurement 24, an and/or current injection means 25, an input voltage measurement 26, a device connection manager and inrush sequencer 27, which controls the spur currents, and a device current limit manager 28 that hosts the prescribed device coupler current limit 18 set according to the macro power management procedures described above, as well as setting each spur current limit according to the micro power management procedures described above. The device coupler 9a also has a plurality of spur outlets, each of which has a spur current limit 29 controlled by the device current limit manager 28. The device couplers 9b-9n are the same as device coupler 9a shown in FIG. 3. Referring back to FIG. 1, this shows hashed lines of communication at 12 between the device coupler 9a and the spurs 11,8 attached thereto, which illustrates the micro power management of spur current limits performed by the device current limit manager 28 as described above.

Therefore, the device couplers 9a-9n are provided with a means for detecting the input terminal voltage and for detecting the input current. They also have the ability to adjust the input current by way of loop current injection whilst monitoring the input voltage. This feature, being the dV/dI=R calculation, can be performed to establish the capacity of a given trunk section 5-7 with respect to other given sections 5-7. The device couplers 9a-9n are also provided with means to communicate with each other and with the management electronics 19, in the known way using Fieldbus telegrams. As an integral part of the current distribution control mechanism 10, the device couplers 9a-9n also have the ability to take part in the adjustment of the operating parameters of other participating devices.

Figure 4:
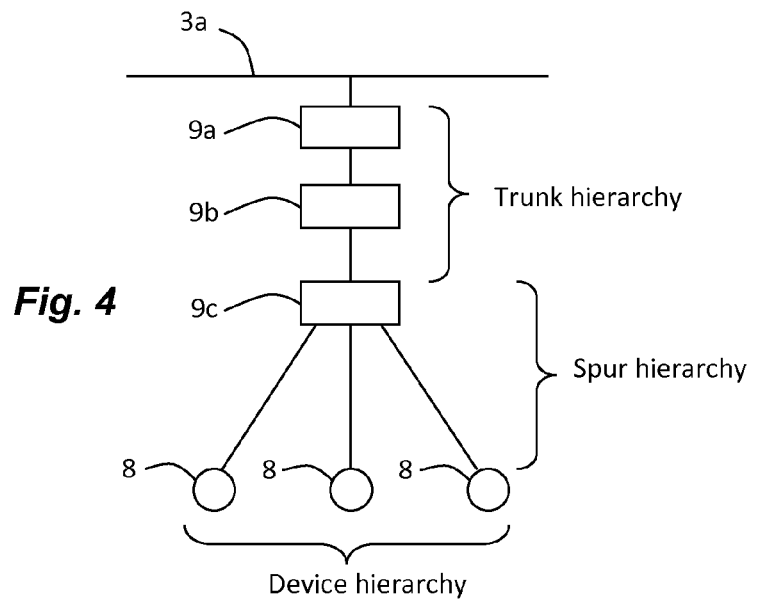
FIG. 4 is a diagrammatic view of a topographic hierarchy of the electrical circuit shown in FIG. 1.

FIG. 4 illustrates the topology hierarchy of the segment shown in FIG. 1, comprising the trunk 3a hierarchy of device couplers 9a-9n, the device coupler 9a-9n hierarchy of spurs 11, and the spur 11 hierarchy of devices 8.

Figure 5:
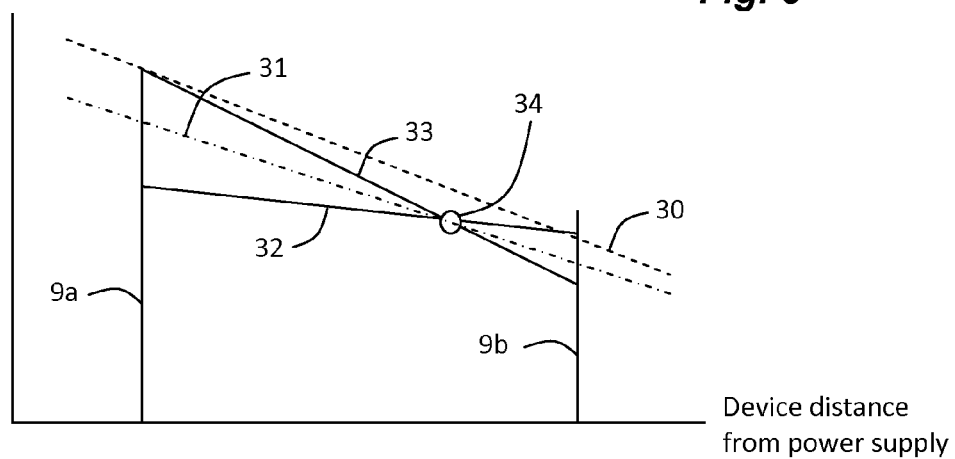
FIG. 5 is a graph illustrating the operating envelope of the electrical circuit shown in FIG. 1.

FIG. 5 illustrates the total segment operating envelope for a given distribution, which shows how the closer a device coupler is to the power supply 4a, the greater an increase in load current can be and still reside within the device coupler's current limit in comparison to device couplers further away. The Y axis in FIG. 5 is the power drawn by the device coupler, and the X axis is its distance from the power supply. Device couplers 9a and 9b are illustrated as lines on the X axis of the graph, the height of which illustrates the power drawn. Hashed line 30 illustrates the maximum possible current limits for device couplers 9a and 9b, and it shows how this must decrease the further the device couplers 9a and 9b are from the power supply 4a. Dot hash line 31 illustrates a headroom which is proportional to the current limits 30. The available headroom decreases in size the further away from the power supply 4a a device coupler is, because the maximum possible current limit 30 decreases. The solid lines 32 and 33 illustrate the power consumption relationship between the device couplers 9a and 9b. If device coupler 9a only consumes a current at the level of line 32, then this results in the power available to device coupler 9b being that of the opposite end of line 32, which is approximately equal to the current limit of device coupler 9b. As such, device coupler 9b can operate as intended. However, if device coupler 9a consumes an increased current at the level of line 33, then this results in the power available to device coupler 9b being that of the opposite end of line 33, which is too low. Conversely, lines 32 and 33 also show how if device coupler 9b consumes current at the level of line 32, then this results in the power available to device coupler 9a being that of the opposite end of line 32, which may be too low for device coupler 9a. Likewise, if device coupler 9b consumes current at the level of line 33, then this results in the power available to device coupler 9a being the opposite end of line 33, which is approximately equal to its current limit, and as such device coupler 9a could operate as intended.

The relevant point about the graph of FIG. 5 is that it shows how a greater degree of change is actually possible at device coupler 9a than at device coupler 9b. The gap between lines 32 and 33 is greater at device coupler 9a's position, than at device coupler 9b's position. This is because the point 34 at which the lines 32 and 33 intersect one another is closer on the X axis to device coupler 9b than device coupler 9a. As such, the scope for adjustment of a device coupler closer to the power supply without adversely affecting downstream device couplers is greater than the scope for adjustment of a device coupler further from the power supply without adversely affecting upstream device couplers. This is factored into the manner in which the current distribution control mechanism 10 of the present invention adjusts the current limits of the device couplers 9a and 9b, and in particular that it will provide device couplers closer to the power supply with a greater current limit than those further away.

Figure 6:
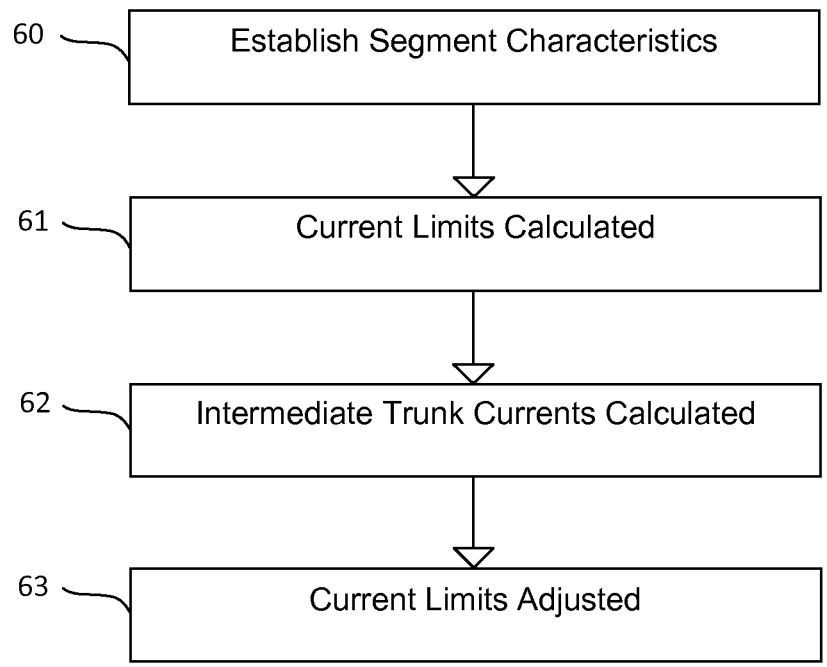
FIG. 6 is a flow chart illustrating the method of the first aspect of the present invention; and, FIG. 7 is a flow chart illustrating the method of the second aspect of the present invention.

FIG. 6 illustrates the method of the first aspect of the present invention. In particular, it shows how in a first step 60 physical characteristics of the segment are established. These are determined in any of the manners described in greater detail above, and then the data is communicated to the first device coupler 9a, and stored in the database 13. These characteristics include at 14 the order in which said device couplers 9a-9n are mounted on said trunk 3a along its length, at 15 a load current each device coupler 9a-9n requires to service the one or more spurs 11 connected thereto, and at 16 a voltage drop of each of said sections 5-7 of trunk 3a caused by the resistive component thereof, which is proportional to a physical length thereof and the combined load currents 15 of each device coupler 9a-9n serviced by that section 5-7 of trunk 3a.

This first step is done by each device coupler 9a-9n firstly taking a measurement of the current and/or voltage of the trunk 3a at its location using its input current measurement 24, and then communicating said measurement, as well as its load current, to the management electronics 19. The management electronics 19 then establishes the order of the device couplers 9a-9n by placing said received measurements in order according to decreasing size. It then establishing the voltage drop of each section 5-7 of trunk 3a caused by the resistive component thereof by deducting the measurement provided by one device coupler 9a-9n from the measurement provided by the device coupler 9a-9n upstream thereof, or in the case of device coupler 9a from a measurement taken by the power supply 4a.

The management electronics 19 can also establish the physical length of each section 5-7 of trunk 3a by combining the load currents 15 of all the device couplers 9a-9n succeeding one device coupler 9a-9n to determine a section current carried by the section 5-7 of trunk 3a downstream thereof, then calculating the physical length of that section 5-7 of trunk 3 as a factor of its consequential reduction in current caused by said voltage drop 16 and said section current.

In a second step 61 the current limits 18 for each device coupler 9a-9n are calculated according to a predetermined rationale. This step is performed by the management electronics 19 in any of the manners described in further detail above. The current limits are stored at 18 in the database 13.

In a third step 62 an intermediate trunk current available to each device coupler 9a-9n is calculated by deducting from the total trunk current the current limits 18 of each device coupler 9a-9n preceding that device coupler 9a-9n in said order 14, as well as the consequential reduction in current caused by the voltage drop 16 of each of said sections 5-7 of trunk 3a preceding that device coupler 9a-9n. This step is performed by the management electronics 19 in any of the manners described in further detail above. The intermediate trunk currents are stored at 17 in the database 13.

In a fourth step 63 the current limits 18 are adjusted so none exceeds the intermediate trunk current 17 available to the corresponding device coupler 9a-9n. This step is also performed by the management electronics 19 in any of the manners described in further detail above. The amended current limits 18 are stored in the database 13, and transmitted to each device coupler 9a-9n.

This fourth step 63 is done by identifying any device coupler 9a-9n with a current limit 18 which exceeds the intermediate trunk current 17 available thereto, and either reducing that device coupler's current limit 18 to be equal to or less than the intermediate trunk current 17 available thereto, or by increasing the intermediate trunk current 17 available thereto so it is equal to or greater than that device coupler's current limit by reducing the current limit 18 of one or more different device couplers 9a-9n upstream and/or downstream thereof. FIG. 5 illustrates how these two options can be actioned, and the effects of each option. If device coupler 9a consumes power at the level of line 33, then the current limit of device coupler 9b can be reduced so it is equal to or less than the opposite end of line 33. Alternatively, the power consumption of device coupler 9a can instead be reduced to the level of line 32, with the effect that the power available to device coupler 9b increases to its desired current limit.

The fourth step 63 can also be done in different ways, including switching off particular spurs 11 of device couplers 9a-9n in order to balance the current drawn across the segment. It can also be done by simply changing the rationale by which the current limits 18 are established to a less conservative model, for example reducing them from 20 percent of the load current to 10 percent. This can be done equally across the segment, or it could be done on a device coupler 9a-9n specific basis according to priority.

Figure 7:
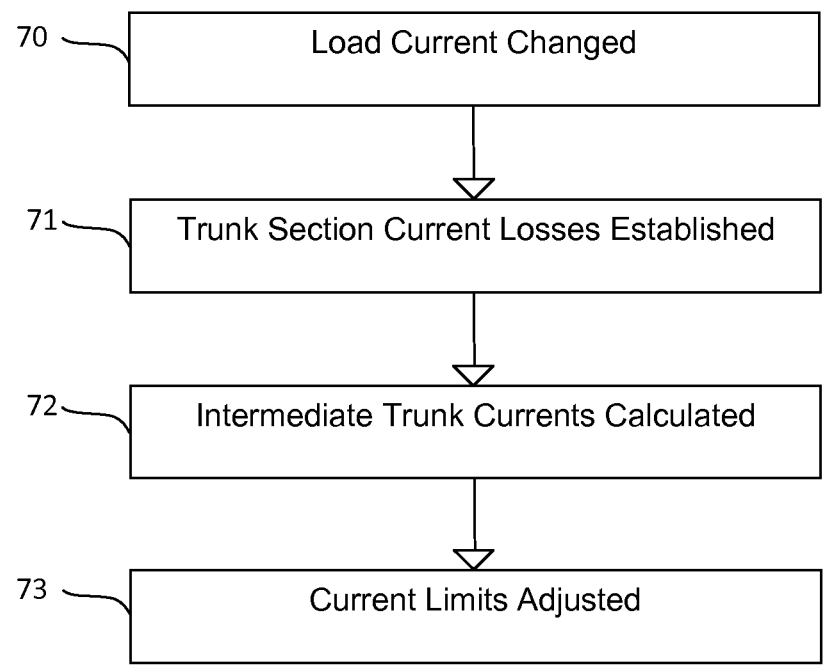

FIG. 7 illustrates the method of the second aspect of the present invention. In particular, it shows how in a first step 70 a load current 15 a subject device coupler 9a-9n draws to service the one or more spurs 11 connected thereto is changed, either deliberately by connecting or disconnecting a spur 11 or unintentionally by means of a fault.

In a second step 71 an amended voltage drop of each section 5-7 of trunk 3a caused by the resistive component thereof is established, which is proportional to its physical length and the changed combined load currents 15 of each device coupler 9a-9n serviced by that section 5-7 of trunk 3a.

This second step 71 is done by each device coupler 9a-9n firstly taking a measurement of the amended current and/or voltage of the trunk 3a at its location, and then communicating said measurement, as well as its load current, to the management electronics 19. The management electronics 19 then establishing the voltage drop 16 of each section 5-7 of trunk 3a caused by the resistive component thereof by deducting the measurement provided by one device coupler 9a-9n from the measurement provided by the device coupler 9a-9n upstream thereof, or in the case of the first device coupler 9a from a measurement provided by the power supply 4a.

In a third step 72 an amended intermediate trunk current available to each device coupler 9a-9n is calculated by deducting from the total trunk current the current limits 18 of each device coupler 9a-9n preceding that device coupler 9a-9n in said order 14, as well as the amended an amended consequential reduction in current caused by the voltage drop 16 of each of said sections 5-7 of trunk 3a preceding that device coupler 9a-9n. This step is performed by the management electronics 19 in any of the manners described in further detail above. The amended intermediate trunk currents are stored at 17 in the database 13.

In a fourth step 73 the current limits 18 are adjusted so none exceeds the amended intermediate trunk current 17 available to the corresponding device coupler 9a-9n. This step is also performed by the management electronics 19 in any of the manners described in further detail above. The amended current limits 18 are stored in the database 13, and transmitted to each device coupler 9a-9n.

This fourth step 73 is performed in the same manner as the fourth step 63 referred to above, by identifying any device coupler 9a-9n with a current limit 18 which exceeds the intermediate trunk current 17 available thereto, and either reducing that device coupler's current limit 18 to be equal to or less than the intermediate trunk current 17 available thereto, or by increasing the intermediate trunk current 17 available thereto so it is equal to or greater than that device coupler's current limit by reducing the current limit 18 of one or more different device couplers 9a-9n upstream and/or downstream thereof.

The fourth step 73 can also be done in different ways, including switching off particular spurs 11 of device couplers 9a-9n in order to balance the current drawn across the segment. It can also be done by simply changing the rationale by which the current limits 18 are established to a less conservative model, for example reducing them from 20 percent of the load current to 10 percent. This can be done equally across the segment, or it could be done on a device coupler 9a-9n specific basis according to priority.

A change to a load current 15 in the first step 70 can be an increase or a decrease in load current 15. If it is an increase then the fourth step 73 can comprise increasing the intermediate trunk current 17 available to the subject device coupler 9a-9n by allocating all or part of a surplus current thereto, which surplus current could be the difference between a different device coupler's load current 15 and current limit 18. This can be done according to a predetermined re-allocation rationale.

The management electronics 19 can comprise a spur hierarchy (not shown) which ranks the spurs 11 of the device couplers 9a-9n according to priority. If so, then the fourth step 73 can comprise the management electronics 19 increasing the subject device coupler's 9a-9n current limit 18 to accommodate the increase in load current 15 by deactivating one or more spurs 11 of other device couplers 9a-9n, or of the subject device coupler 9a-9n, which rank lower than one or more spurs 11 of the subject device coupler 9a-9n in said spur hierarchy.

If a change in load current 15 in the first step 70 is a decrease in load current 15 to zero, then in the second to fourth steps 71-73 the subject device coupler 9a-9n can be excluded from consideration. This means that the subject device coupler 9a-9n is not provided with any current headroom for faults, and instead such current capacity can be redistributed elsewhere in the segment.

Any of the known segment design tools or segment design checking systems can be used to initially size and design the segment shown in FIG. 1. This initial design will define the parameters of the power supply 4a, the cable 3a and all the loads 8 and/or load 8 types. It will also draft hook-up diagrams and perform calculations of the segment, ensuring that the voltages and currents are adequate for the given design, and in particular for each point on the segment.

This initial design will be stored in a database associated with the segment (not shown) as a design template. However, as referred to above, the methods of the first and second aspects of the present invention will result in amended versions of this design template, based on the actual power consumption and various current distribution decisions which have been made. A first amended version will be arrived at after the method of the first aspect of the present invention has been performed when the segment is set-up, and further amended versions will be arrived at after the method of the second aspect of the present invention is performed whenever a current demand changes in use.

Whenever this happens, the new design will be time-stamped automatically, or this can be done whenever an automatic update is requested, which can be at any chosen frequency. This will result in historical data being preserved if required. This will have value in the monitoring, logging and updating of any records for the segment, because time stamped information about any unscheduled changes or attempts to change the segment, or of any failures thereon, will be recorded. The sequence of design changes can be used to check for things like current or voltage drifts over time. Any major or notable changes can also be flagged up with alarms, thus integrating the methodology of the present invention into advanced diagnostic monitoring.

Therefore, the three aspects of the present invention provide a way to significantly improve the performance of two-wire segments, by means of a self-regulating current distribution based on actual rather than theoretical current draw. This results in a greater resistance to failure, because potentially harmful voltage drops are anticipated and the design changed to accommodate them. It also results in a balancing of the headroom across the segment according to device priority.

The invention claimed is:

1. A method of establishing current limits for each of a plurality of device couplers mounted on a trunk of an electrical circuit at distributed physical positions, in which each of said device couplers is capable of servicing one or more spurs connected thereto, and in which said trunk has a total trunk current and a known resistive component, comprising the steps of:
   a) establishing physical characteristics of the electrical circuit including i) an order in which said device couplers are mounted on said trunk along its length; ii) a load current each device coupler requires to service the one or more spurs connected thereto; and, iii) a voltage drop of each of said sections of trunk caused by the resistive component thereof, which is proportional to a physical length thereof and the combined load currents of each device coupler serviced by that section of trunk;
   b) calculating a current limit for each device coupler, which current limit is greater than said load current, according to a predetermined tolerance rationale;
   c) calculating an intermediate trunk current available to each device coupler by deducting from said total trunk current the current limits of each device coupler preceding that device coupler in said order, as well as a consequential reduction in current caused by said voltage drop of each of said sections of trunk preceding that device coupler; and,
   d) adjusting said current limits so none exceeds the intermediate trunk current available to the corresponding device coupler.

2. A method of establishing current limits as claimed in claim 1, in which step d) comprises identifying any device coupler with a current limit which exceeds the intermediate trunk current available thereto, and either reducing that device coupler's current limit to be equal to or less than the intermediate trunk current available thereto, or increasing the intermediate trunk current available thereto so it is equal to or greater than that device coupler's current limit by reducing the current limit of one or more different device couplers upstream and/or downstream thereof.

3. A method of establishing current limits as claimed in claim 1, in which said electrical circuit further comprises a power supply and a current distribution control mechanism,
   in which step a) comprises each device coupler and said power supply taking a measurement of the current and/or voltage of said trunk and then communicating to said current distribution control mechanism said measurement, and in the case of each device coupler also communicating to said current distribution control mechanism said load current that device coupler requires to service the one or more spurs connected thereto,
   in which step a) comprises the current distribution control mechanism establishing said order in which said device couplers are mounted on said trunk by placing said measurements in order according to decreasing size, and
   in which step a) comprises the current distribution control mechanism establishing the voltage drop of each of said sections of trunk caused by the resistive component thereof by deducting the measurement provided by one device coupler from the measurement provided by the device coupler upstream thereof, or in the case of the first device coupler in said order the measurement provided by said power supply.

4. A method of establishing current limits as claimed in claim 1, in which step a) further comprises the current distribution control mechanism establishing the physical length of each of said sections of trunk by combining the load currents of all the device couplers succeeding one device coupler to determine a section current carried by the section of trunk downstream thereof, then calculating the physical length of that section of trunk as a factor of its consequential reduction in current caused by said voltage drop and said section current.

5. A method of adjusting current limits for each of a plurality of device couplers mounted on a trunk of an electrical circuit at distributed physical positions, in which each of said device couplers is capable of servicing one or more spurs connected thereto, in which said trunk has a total trunk current and a known resistive component, in which said device couplers are mounted in an order on said trunk along its length, thereby dividing said trunk into sections extending between said device couplers, each of which has a voltage drop caused by the resistive component thereof, in which each of said device couplers comprises an adjustable current limit established according to the method of claim 1, comprising the steps of:
  a) changing a load current a subject device coupler draws to service the one or more spurs connected thereto, either deliberately by connecting or disconnecting a spur or unintentionally by means of a fault;
  b) establishing an amended voltage drop of each of said sections of trunk caused by the resistive component thereof, which is proportional to its physical length and the changed combined load currents of each device coupler serviced by that section of trunk;
  c) calculating an amended intermediate trunk current available to each device coupler by deducting from said total trunk current the device coupler current limits of each device coupler preceding that device coupler in said order, as well as an amended consequential reduction in current caused by said voltage drop of each of said sections of trunk preceding that device coupler; and,
  d) adjusting said current limits so none exceeds the intermediate trunk current available to the corresponding device coupler.

6. A method of adjusting current limits as claimed in claim 5, in which in each case the difference between a device coupler's load current and current limit is a surplus current, in which step a) comprises increasing a load current said subject device coupler draws to service the one or more spurs connected thereto, and in which step d) comprises increasing the intermediate trunk current available to said subject device coupler by allocating all or part of a surplus current thereto.

7. A method of adjusting current limits as claimed in claim 6, when dependent on claim 3, in which in step a) said subject device coupler communicates said increase in load current to said current distribution control mechanism, and in which step d) comprises said current distribution control mechanism adjusting one or more of said device coupler current limits in order to allocate all or part of a surplus current to said subject device, according to a predetermined re-allocation rationale.

8. A method of adjusting current limits for each of a plurality of device couplers mounted on a trunk of an electrical circuit at distributed physical positions, in which each of said device couplers is capable of servicing one or more spurs connected thereto, in which said trunk has a total trunk current and a known resistive component, in which said device couplers are mounted in an order on said trunk along its length, thereby dividing said trunk into sections extending between said device couplers, each of which has a voltage drop caused by the resistive component thereof, in which each of said device couplers comprises an adjustable current limit established according to the method of claim 3, comprising the steps of:
  a) changing a load current a subject device coupler draws to service the one or more spurs connected thereto, either deliberately by connecting or disconnecting a spur or unintentionally by means of a fault;
  b) establishing an amended voltage drop of each of said sections of trunk caused by the resistive component thereof, which is proportional to its physical length and the changed combined load currents of each device coupler serviced by that section of trunk;
  c) calculating an amended intermediate trunk current available to each device coupler by deducting from said total trunk current the device coupler current limits of each device coupler preceding that device coupler in said order, as well as an amended consequential reduction in current caused by said voltage drop of each of said sections of trunk preceding that device coupler; and,
  d) adjusting said current limits so none exceeds the intermediate trunk current available to the corresponding device coupler,
  in which said current distribution control mechanism comprises a spur hierarchy, which ranks spurs of said device couplers according to priority, in which step a) comprises increasing a load current demand of said subject device coupler to a level greater than said subject device coupler's current limit, and in which in step d) said current distribution control mechanism increases said subject device coupler's current limit to accommodate said increase in load current demand by deactivating one or more spurs of other device couplers, or of said subject device coupler, which rank lower than one or more spurs of said subject device coupler in said spur hierarchy.

9. A method of adjusting current limits as claimed in claim 5, in which step a) comprises decreasing a load current said subject device coupler draws to zero by disconnecting all spurs therefrom, and in which in steps b) to d) said subject device coupler is excluded from consideration.

10. An electrical circuit comprising a power supply, a trunk, a plurality of device couplers mounted on said trunk at distributed physical positions, and a current distribution control mechanism for performing the method of claim 1,
  in which each of said device couplers is capable of servicing one or more spurs connected thereto, and comprises an electronically adjustable current limit,
  in which said trunk has a total trunk current and a known resistive component, in which said device couplers are mounted in an order on said trunk along its length, thereby dividing said trunk into sections extending between said device couplers, each of which has a voltage drop caused by the resistive component thereof,
  in which said current distribution control mechanism comprises a database populated with data after the method of claim 1 has been performed, said data comprising i) an order in which said device couplers are mounted on said trunk along its length; ii) a load current each device coupler requires to service the one or more spurs connected thereto; iii) a voltage drop of each of said sections of trunk caused by the resistive component thereof, which is proportional its physical length and the combined load currents of each device coupler serviced by that section of trunk; iv) an intermediate trunk current available to each device coupler; and v) a current limit for each device coupler, which current limit is greater than said load current, according to a predetermined tolerance rationale, and which also does not exceed the intermediate trunk current available thereto,
  and in which in the event of a change in current demand made by one of said device couplers said current distribution control mechanism is adapted to adjust the current limit of one or more of said device couplers to accommodate said change in current demand.

11. An electrical circuit as claimed in claim 10 in which said current distribution control mechanism comprises one or more of said plurality of device couplers.

12. An electrical circuit as claimed in claim 10 in which said current distribution control mechanism comprises management electronics.

* * * * *